United States Patent
Torii et al.

(10) Patent No.: US 7,308,432 B2
(45) Date of Patent: Dec. 11, 2007

(54) VEHICLE MOTION MODEL GENERATING DEVICE AND METHOD FOR GENERATING VEHICLE MOTION MODEL

(75) Inventors: Tsuyoshi Torii, Tokyo (JP); Itaru Seta, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 358 days.

(21) Appl. No.: 10/779,717

(22) Filed: Feb. 18, 2004

(65) Prior Publication Data

US 2004/0162644 A1   Aug. 19, 2004

(30) Foreign Application Priority Data

Feb. 19, 2003   (JP)   ............................. 2003-041507

(51) Int. Cl.
*G06E 1/00* (2006.01)
*G06E 3/00* (2006.01)
*G06F 15/18* (2006.01)
*G06F 7/00* (2006.01)
*G06F 19/00* (2006.01)
*G06G 7/00* (2006.01)
*G05B 13/02* (2006.01)
*G01M 17/00* (2006.01)
*G01C 21/00* (2006.01)

(52) U.S. Cl. ........................... 706/21; 701/25; 701/35; 701/36; 701/200

(58) Field of Classification Search .................... 706/1, 706/15, 45, 16, 31, 21; 700/1, 90, 83; 395/81; 318/568.11; 701/96, 1, 110, 21, 20, 25, 35, 701/36, 200; 73/8

See application file for complete search history.

(56) References Cited

U.S. PATENT DOCUMENTS 5,579,442 A * 11/1996 Kimoto et al. ............... 700/246
6,042,548 A *  3/2000 Giuffre ........................ 600/483

(Continued)

FOREIGN PATENT DOCUMENTS

JP    04-138970    5/1992

(Continued)

OTHER PUBLICATIONS

'Elements of Artificial Neural Networks': Mehrotra, Mohan, Ranka, 1997, MIT Press, 136-139.*

(Continued)

*Primary Examiner*—David Vincent
*Assistant Examiner*—Peter Coughlan
(74) *Attorney, Agent, or Firm*—McGinn IP Law Group, PLLC (57) ABSTRACT

There are equipped a first recurrent neural network formed by connecting plural nodes so as to have a loop in which the output from one node is input to another node in accordance with a predetermined coupling weight coefficient. Meanwhile, the output of at least one node is fed back to the node concerned or another node, and an optimizing unit for determining the optimum solution of the coupling weight coefficient in the first recurrent neural network based on a learning rule using a hereditary algorithm. In this case, the first recurrent neural network outputs a first parameter indicating a motion state of a vehicle based on predetermined input information, thereby functioning as a vehicle motion model.

20 Claims, 8 Drawing Sheets

U.S. PATENT DOCUMENTS

| | | | |
|---|---|---|---|
| 6,092,018 A * | 7/2000 | Puskorius et al. | 701/110 |
| 6,208,102 B1 * | 3/2001 | Kikuchi et al. | 318/466 |
| 6,397,140 B2 * | 5/2002 | Minowa et al. | 701/96 |
| 2002/0045958 A1 * | 4/2002 | Kamihira et al. | 700/83 |
| 2002/0158599 A1 * | 10/2002 | Fujita et al. | 318/568.11 |

FOREIGN PATENT DOCUMENTS

| | | |
|---|---|---|
| JP | 06-286630 | 10/1994 |
| JP | 08-002274 | 1/1996 |
| JP | 10-242030 | 9/1998 |

OTHER PUBLICATIONS

'Elements of Artificial Neiral Networks': Mefrotra, Mohan, Ranka, 1997, MIT Press, pp. 136-139.*

'Training Neural Nets with the Reactive Tabu Search': Battiti, 1995, IEEE, p. 1185-1200.*

'Application of Modern Synthesis to Aircraft Control: Three Case Studies': Gangsaas, 1986, IEEE, p. 995-1014.*

* cited by examiner

| OUTPUT<br>INPUT | NODE N1 | NODE N2 | . . . | NODE Nn-1 | NODE Nn |
|---|---|---|---|---|---|
| NODE N1 | K11 | K12 | | K1(n-1) | K1n |
| NODE N2 | K21 | K22 | | K2(n-1) | K2n |
| . . . | | | | | |
| NODE Nn-1 | K(n-1)1 | K(n-1)2 | | K(n-1)(n-1) | K(n-1)n |
| NODE Nn | Kn1 | Kn2 | | Kn(n-1) | Knn |

VEHICLE MOTION MODEL GENERATING DEVICE AND METHOD FOR GENERATING VEHICLE MOTION MODEL

BACKGROUND OF THE INVENTION

1. Field of the Invention

The present invention relates to a vehicle motion model generating device for generating a vehicle motion model which represents a motion state of a vehicle and a method for generating a vehicle motion model, and more specifically to a vehicle motion model using a recurrent neural network.

2. Description of the Related Art

Researches and developments of various techniques have been hitherto carried out in order to enhance the operational stability of vehicles. As one of these techniques is known a vehicle motion model generated by modeling the behavior of a vehicle based on the kinematic theory of a vehicle. The vehicle motion model is generated through experiments or simulations by modeling a yawing motion, a horizontal motion, a rolling motion, etc. of a vehicle under some running condition, and set based on equations for motion of the vehicle. The operational stability of the vehicle can be estimated by analyzing the behavior of the vehicle, that is, the motion state of the vehicle or a vehicle motion state based on the vehicle motion model.

Furthermore, a road surface friction coefficient is used for the operation of control parameters in order to perform vehicle control such as traction control, braking force control, torque distributing control or the like. Thus, there has been proposed a technique of using the vehicle motion model as described above and estimating the road surface friction coefficient based on the vehicle motion model and the actual vehicle motion state. For example, JP-A-8-2274 discloses a method of estimating the road surface friction coefficient by using adaptive control. In addition, JP-A-10-242030 discloses a method of estimating the road surface friction coefficient by comparing a vehicle slipping angle estimated by an observer with a reference value on a high μ-road based on the vehicle motion model and a reference value on a low μ-road based on the vehicle motion model.

JP-A-4-138970 discloses a method of estimating the motion state of the vehicle by using a neural network. Specifically, a side slipping angle and a yaw rate are estimated on the basis of a neural network in which an easily-measurable parameters (for example, a longitudinal acceleration, a lateral acceleration, a vertical acceleration, a stirring torque, a front-wheel rudder angle, a vehicle speed, a rear-wheel rudder angle, etc.) in the vehicle parameters representing the motion state of the vehicle are set as inputs and difficultly-measurable parameters (a side slipping angle and a yaw rate) are set as outputs. Furthermore, JP-A-6-286630 discloses a method of estimating the road surface friction coefficient based on the running condition of the vehicle detected by using the neural network. According to the JP-A-4-138970 and JP-A-6-286630, in the neural network, adjustment (learning) of the coupling weight coefficient is carried out in advance according to an algorithm such as back propagation so that the output corresponds to a teaching signal.

According to the method described in the JP-A-8-2274 or JP-A-10-242030, when a vehicle motion model is set, a motion equation is linearly approximated to avoid cumbersome operation processing in the solution calculating process. Therefore, the vehicle motion model may not accurately represent the motion state of the vehicle, that is, the behavior of the vehicle in a non-linear region.

Furthermore, according to the method described in the JP-A-4-138970, a feed-forward type neural network is used, the value output from the neural network and the value input to the neural network are independent of each other. Thus, the motion state of the vehicle may not be accurately represented in such a neural network. In particular, the values output from the neural network (for example, the side slipping angle and the yaw rate) are varied in accordance with not only the input, but also the value thereof at the present time (a present value). Consequently, it is necessary to feed back the output value and reflect the output value to the neural network, in order to estimate the motion state of the vehicle with high precision. In this sense, the JP-A-6-286630 supplies the time delay value of the output value to an input layer by using an ARAM model, thereby enhancing the estimation precision of the road surface friction coefficient. However,the neural network having such feedback has a problem that the coupling weight coefficient cannot be learned according to the principle of a learning rule such as back propagation. Thus, accurate estimation of the road surface friction coefficient is hardly achieved.

The present invention has been implemented in view of the foregoing situation, and has an object to provide a novel method of creating a motion model of a vehicle by using a recurrent neural network containing a feedback loop.

SUMMARY OF THE INVENTION

The present invention has been implemented in view of the foregoing situation, and has an object to provide a novel method of creating a motion model of a vehicle by using a recurrent neural network containing a feedback loop.

In order to solve such problems, a first invention provides a vehicle motion model generating device for generating a vehicle motion model that represents a motion state of a vehicle. This vehicle motion model generating device includes a first recurrent neural network formed by connecting plural nodes so that an output of a node is input to another node in accordance with a predetermined coupling weight coefficient, including a loop feeding back an output of at least one node to at least one of the one node and a node other than the one node, and an optimizing unit for determining an optimum solution of the coupling weight coefficient in the first recurrent neural network based on a learning rule using a hereditary algorithm. Here, the first recurrent neural network outputs a first parameter indicating the motion state of the vehicle based on predetermined input information, thereby functioning as the vehicle motion model.

In the first invention, the first recurrent neural network may have a hierarchical structure including at least an input layer formed of one or more nodes and an output layer formed of one or more nodes. In this case, it is preferable that the optimizing unit determines the optimum solution of the coupling weight coefficient with connection of respective nodes between neighboring layers being set as a processing target. Correspondingly, in the first invention, the first recurrent neural network may be formed of the plural nodes connected mutually so that the output of the one node is input to all the plural nodes including the one node, and respective outputs of the plural nodes are input to the one node. In this case, it is preferable that the optimizing unit determines the optimum solution of the coupling weight coefficient with mutual connection of the plural nodes being set as a processing target.

In the first invention, it is preferable that each of the plural nodes uses one of a sigmoid function and a non-sigmoid function other than the sigmoid function as a transfer function.

Further, in the first invention, the vehicle motion state model generating device may includes a second recurrent neural network constructed as a network different from the first recurrent neural network, functioning as the vehicle motion model by outputting a second parameter indicating a motion state of the vehicle different from the first parameter. It is preferable that the optimizing unit further determines the optimum solution of the coupling weight coefficient in the second neural network based on the learning rule using the hereditary algorithm. In this case, it is preferable that the first recurrent neural network and the second recurrent neural network are mutually connected to each other so that a state variable having a correlation with the first parameter output from the first recurrent neural network is input to the second neural network. Here, the state variable represents a road surface state or a motion state of the vehicle.

A second invention provides a method for generating a vehicle motion model that represents a motion state of a vehicle. The method, in which a first recurrent neural network is formed by connecting plural nodes so that an output of a node is input to another node in accordance with a predetermined coupling weight coefficient and includes a loop feeding back an output of at least one node to at least one of the one node and a node other than the one node, is executed by a computer, and includes the steps of determining an optimum solution of a genetic type based on a learning rule using a hereditary algorithm while setting the coupling weight coefficient in the first recurrent neural network as the genetic type, and outputting an optimum solution of the coupling weight coefficient to the first recurrent neural network based on the optimum solution of the genetic type. Here, the first recurrent neural network outputs a parameter indicating the motion state of the vehicle based on predetermined input information, thereby functioning as the vehicle motion model.

In the second invention, the first recurrent neural network may have a hierarchical structure including at least an input layer formed of one or more nodes and an output layer formed of one or more nodes. Here, the method may include the step of determining the optimum solution of the genetic type while connection of respective nodes between neighboring layers is set as a processing target. Correspondingly, the first recurrent neural network may be formed of the plural nodes connected mutually so that the output of the one node is input to all the plural nodes including the one node, and respective outputs of the plural nodes are input to the one node. Here, the method may include the step of determining the optimum solution of the coupling weight coefficient while mutual connection of respective nodes is set as a processing target.

In the second invention, it is preferable that a second recurrent neural network is constructed as a network different from the first recurrent neural network, and functions as the vehicle motion model by outputting a second parameter indicating a motion state of the vehicle different from the first parameter. The method preferably includes the steps of determining the optimum solution of the genetic type while setting the coupling weight coefficient in the second recurrent neural network as the genetic type, and outputting the optimum solution of the coupling weight coefficient to the second recurrent neural network based on the optimum solution of the genetic type. Further, it is preferable that the first recurrent neural network and the second recurrent neural network are mutually connected to each other so that a state variable having a correlation with the first parameter output from the first recurrent neural network is input to the second neural network. Here, the state variable represents one of a road surface state and a motion state of the vehicle.

A third invention provides a road surface friction coefficient estimating device for estimating a road surface friction coefficient. This road surface friction coefficient estimating device estimates the road surface friction coefficient based on a vehicle motion model that represents a motion state of a vehicle and is generated by a vehicle motion model generating device which is provided in the above first invention.

A fourth invention provides a vehicle behavior estimating device for estimating a behavior of a vehicle. This vehicle behavior estimating device estimates the behavior of the vehicle based on a vehicle motion model that represents a motion state of the vehicle and is generated by a vehicle motion model generating device that is provided in the above first invention.

DESCRIPTION OF PREFERRED EMBODIMENTS

First Embodiment

Figure 1:
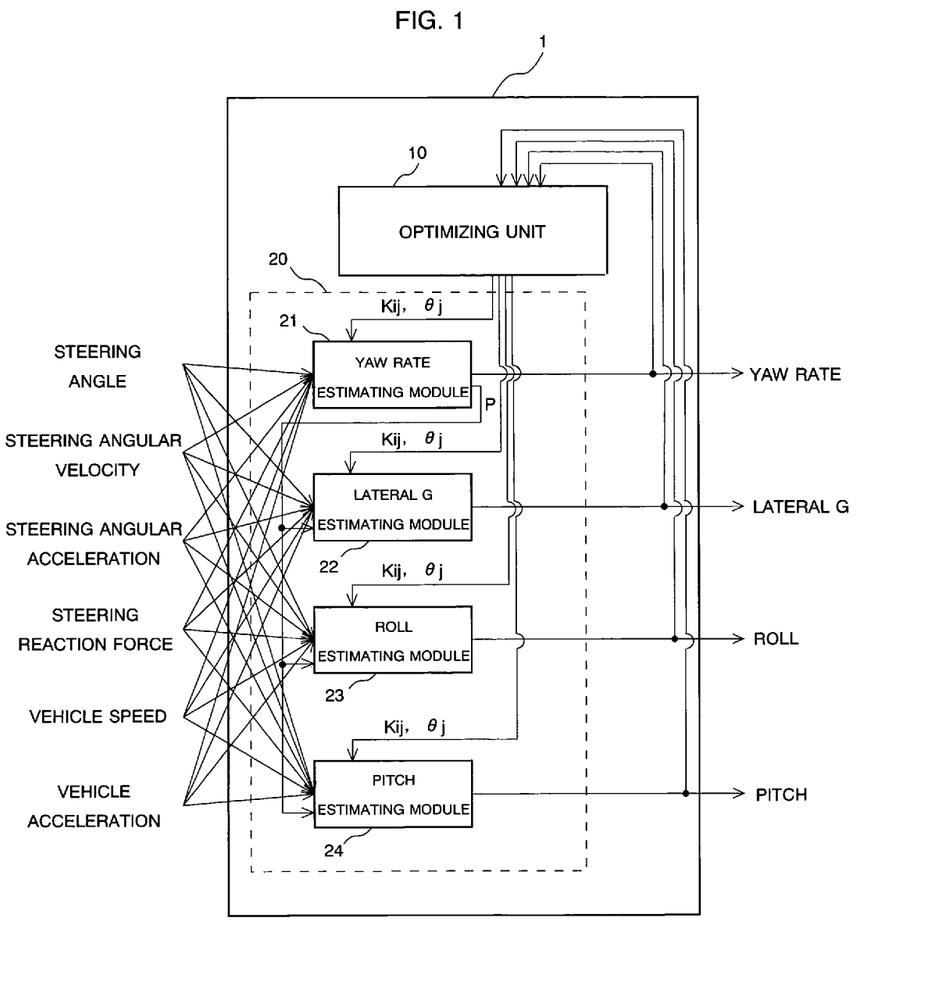
FIG. 1 is a block diagram showing the construction of a vehicle motion model generating device according to an embodiment.

FIG. 1 is a block diagram showing the construction of a vehicle motion model generating device for generating a vehicle motion model according to the present embodiment. This vehicle motion model generating device or, simply a generating device generates a vehicle motion model representing the motion state of a vehicle or a vehicle motion state. The generating device 1 may be used as a computer comprising a CPU, a RAM, a ROM, an input/output interface, etc. As not clearly shown in FIG. 1, an input device containing a keyboard and a mouse, a display device such as CRT and a liquid crystal display device are connected to the generating device 1. An operator can input necessary information, etc. by operating the input device based on the information displayed on the display device. From the functional aspect of the generating device 1, it comprises an optimizing unit 10 and a vehicle motion model unit 20.

The optimizing unit 10 carries out an operation based on a learning rule using a genetic algorithm, and outputs predetermined parameters as an operation result to the vehicle motion model unit 20. As described later, these parameters correspond to a coupling weight coefficient Kij of a recurrent neural network and a threshold value θj, since each of estimating modules 21 to 24 constituting the vehicle motion model unit 20 is constructed by the recurrent neural network. Here, "the recurrent neural network" means a neural network having a feedback loop.

The vehicle motion model unit 20 includes one or more estimating modules (in the present embodiment, the estimating modules 21 to 24), where each of the estimating modules 21 to 24 functions as a vehicle motion model representing a distinct motion state. Each of the estimating modules 21 to 24 includes a recurrent neural network (hereinafter merely referred to as "RNN"), and outputs a parameter indicating the motion state of a vehicle (hereinafter referred to as "vehicle parameters") based on predetermined input information. In the present embodiment, four vehicle parameters are output from the vehicle motion model unit 20. Specifically, the estimating module 21 outputs an estimation value of the yaw rate as a vehicle parameter, and the estimating module 22 outputs an estimation value of the lateral acceleration (hereinafter merely referred to as "lateral G") as a vehicle parameter. Furthermore, the estimating module 23 outputs an estimation value of roll as a vehicle parameter, and the estimating module 24 outputs an estimation value of pitch as a vehicle parameter.

Figure 2:
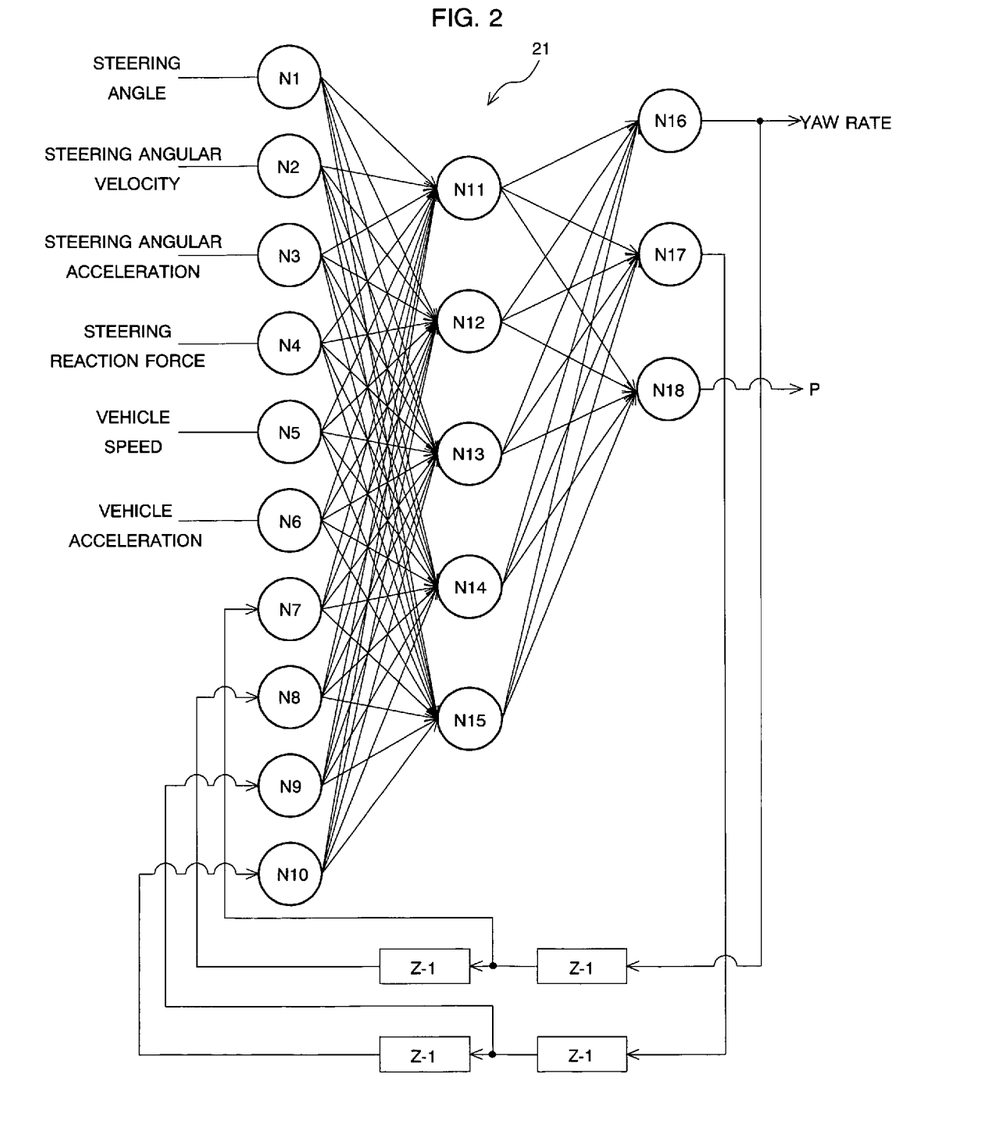
FIG. 2 is a diagram showing the structure of RNN which functions as an estimating module.

FIG. 2 is a diagram showing the structure of the RNN which functions as the estimating module. Here, the RNN constituting the estimating module 21 for the yaw rate is used for description of the RNN. On the other hand, the description of the other estimation modules 22 to 24 is omitted because the RNNs constituting the other estimating module 22 to 24 have basic structures similar to that of the estimating module 21. In the RNN, a network is formed by connecting plural nodes Nn For example, nodes N1 to N18 are shown in FIG. 2. The plural nodes Nn are hierarchically sectioned, thereby forming a hierarchical structure including an input layer, an intermediate layer and an output layer. The number of the nodes Nn constituting each layer is properly set by the operator. In this case, the operator determines the structure of the network so that each layer has the optimum node number in consideration of the conflicting relationship between the enhancement in reliability of the solution achieved by increasing the number of the nodes Nn and enhancement of processing speed achieved by reducing the number of the nodes Nn.

The output layer is equipped with one node Nn (the node N16) for outputting a vehicle parameter. However, in the present embodiment, a feedback loop from the output layer to the input layer exists as described later. Additionally, the node N17 aiming only at the feedback is further set to carry out the feedback to the input layer in a multiplexing style. Furthermore, in FIG. 2, the node N18 for outputting a state variable P is set separately from the vehicle parameter in the RNN constituting the estimating module 21 for the yaw rate. The state variable P output from the node N18 is input to the input layer node Nn of the RNN constituting the estimating modules 22 to 24 for the lateral G, the roll and the pitch.

The numbers of nodes Nn necessary to input the input information are set in the input layer. Here, the input information is required for the RNN to output the vehicle parameter. In the present embodiment, the input information corresponds to a steering angle, a steering angular velocity, a steering angular acceleration, a steering reaction force, a vehicle speed, a vehicle acceleration, etc. Furthermore, the nodes N7 to N10 associated with the feedback are also set in the input layer, in connection with the feedback from the outputs of the output layer nodes N16, N17 to the input layer. The nodes Nn for inputting the state variable P shown in FIG. 1 are further set in the other estimating modules 22 to 24. These nodes Nn are not specifically shown in FIG. 2 because the RNN constituting the estimating module 21 for the yaw rate is illustrated.

Considering the above-described relationship, a required number of the nodes Nn are prepared based on an operator's experience, for instance. In the example shown in FIG. 2, the intermediate layer includes five nodes Nn of the nodes N11 to N15.

When the nodes Nn constituting each layer is set as described above, the connection among the nodes is automatically determined. In the hierarchical type RNN, the connection of the among is determined so that the output of each node Nn constituting some layer is input to all the nodes Nn constituting the layer at the subsequent stage. For example, the node N1 of the input layer is input to all the nodes N11 to N15 of the intermediate layer as shown in FIG. 2.

As one feature of the present embodiment, the RNN has a loop for feeding back the output of some node Nn. Specifically, as shown in FIG. 2, the output of the output layer node N16 is output as a yaw rate which is one of the vehicle parameters, delayed for only one cycle by a first delay circuit $Z^{-1}$, and then, input to the input layer node N7. The output from the first delay circuit $Z^{-1}$ is further delayed for only one cycle by a second delay circuit $Z^{-1}$ equipped at the subsequent stage thereto (accordingly, after delayed for two cycles with respect to the initial input corresponding to the output of the node N16), and then input to the input layer node N8. On the other hand, the output of the node N17 of the output layer is delayed for only one cycle by a third delay circuit $Z^{-1}$ different from the first and second delay circuits $Z^{-1}$, and then input to the input layer node N9. Furthermore, the output from the third delay circuit $Z^{-1}$ is further delayed for only one cycle by a fourth delay circuit $Z^{-1}$ equipped at the subsequent stage (accordingly, after delayed for only two delays with respect to the initial input corresponding to the output of the node N17), and then input to the input layer node N10.

In such a RNN, each node Nn generates one output Yi for a predetermined number of inputs yi according to a predetermined transfer function. The output Yi is output to the nodes Nn constituting the layer at the subsequent stage. Specifically, each node Nn carries out the calculation represented equations 1, 2 on the input data yi, and outputs the calculation result as an output data Yj. Here, Kij represents the coupling weight coefficient between an (n=i)-th (i=1 to 15) node Ni and an (n=j)-th (j=11 to 15 (i=1 to 10), j=16 to 18 (i=11 to 15)) node Nj, and θj represents a threshold value.

$$Xj = \Sigma Kij \cdot yi \,(i=1 \text{ to } n) \qquad \text{[Equation 1]}$$

$$Yj = 1/(1 + \exp(-(Xj - \theta j))) \qquad \text{[Equation 2]}$$

As apparent from the above equations 1, 2, the output of some node Nn is input to another node Nn in accordance with a predetermined coupling weight coefficient Kij. Here, the equation 2 is called as a sigmoid function which generally used as a function for nodes in the RNN. The sigmoid function continuously varies from 0 to 1, and the threshold value θj approaches to a step function as it is reduced.

When the vehicle parameter is estimated by using the RNN, proper adjustment (learning) of the coupling weight coefficient Kij and the threshold value θj is required in order to enhance the precision of the estimation result. The optimum solution of the coupling weight coefficient Kij and the threshold value θj is learned and properly determined by the optimizing unit 10 described above. The connection to be processed by the optimizing unit 10 becomes the connection of the respective nodes between the neighboring layers except for the feedback loop.

Figure 3:
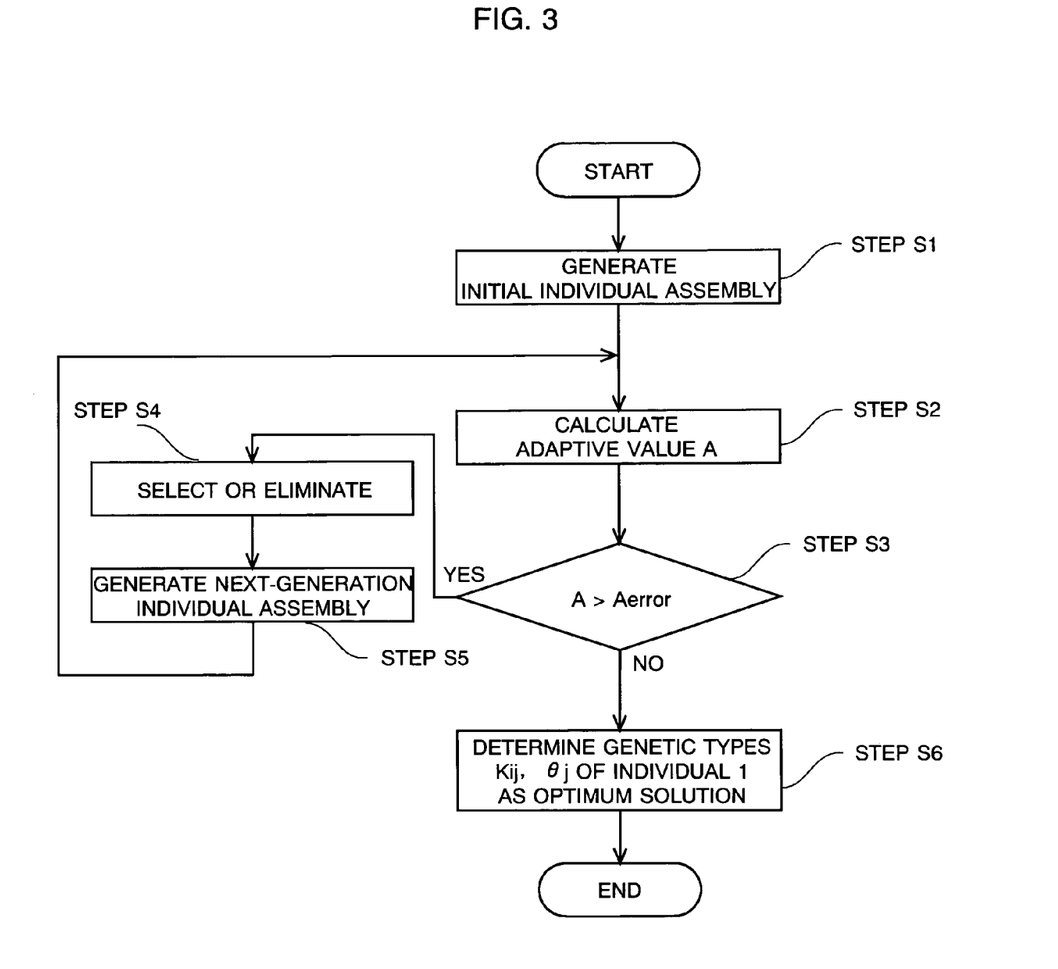
FIG. 3 is a flowchart showing the procedure of determining the optimum solution of a weight coefficient and a threshold value by using a genetic algorithm.

FIG. 3 is a flowchart showing the procedure of determining the optimum solution of the weight coefficient wij and the threshold value θj by using the genetic algorithm. The processes shown in FIG. 3 are carried out by the optimizing unit 10. The optimizing unit 10 carries out the following processes on each of the estimation modules 21 to 24. In this case, the estimation module (RNN) 21 for the yaw rate will be described as an example. Since the same processes are carried out on the other estimation modules (RNN) 22 to 24, the description of the other estimation modules 22 to 24 is omitted.

Initially, in step S1, an initial individual assembly is formed by a set of N individuals each including a genetic type. Here, the genetic type corresponds to the coupling weight coefficient Kij and the threshold value θj. In this case, one individual includes a genetic type containing all the coupling weight coefficients Kij and threshold values θj in the RNN. The initial individual assembly is a set of N individuals described above, and includes genetic types Kij, θj varied by each individual. For example, the initial value of the genetic type Kij, θj constituting each individual 1 to N is determined by a random number. In other words, if a coupling weight coefficient Kij and a threshold value θj are substituted into the RNN for every individual 1 to N, the RNNs of N are calculated, each having the determined coupling weight coefficients Kij and the threshold values θj.

The next, in step S2, an adaptive value A is calculated. On the assumption that the adaptive value A is calculated, the operator beforehand obtains through experiments or simulations a vehicle parameter which is actually indicated by a vehicle under a predetermined condition (hereinafter referred to as "an actual vehicle parameter"). The operator stores a map describing the relationship between the predetermined condition and the actual vehicle parameter into the ROM of the generating device 1. The predetermined condition described in the map is parameters input to the input layer node Nn except for the feedback elements, and corresponds to the steering angle, steering angular velocity, the steering angular acceleration, the steering reaction force, the vehicle speed and the vehicle acceleration. Based on the above-described assumption, referring to the map, the optimizing unit 10 inputs these conditions to the respective input layer nodes N1 to N6 of the RNN, and acquires an estimation value of the vehicle parameter (hereinafter referred to as "an estimated vehicle parameter") as the output of the output layer node N16. The adaptive value A is calculated based on the estimated vehicle parameter and the actual vehicle parameter by using an estimation function represented by an equation 3.

$$A = \Sigma |Vt - Vc| \quad \text{[Equation 3]}$$

Figure 4:
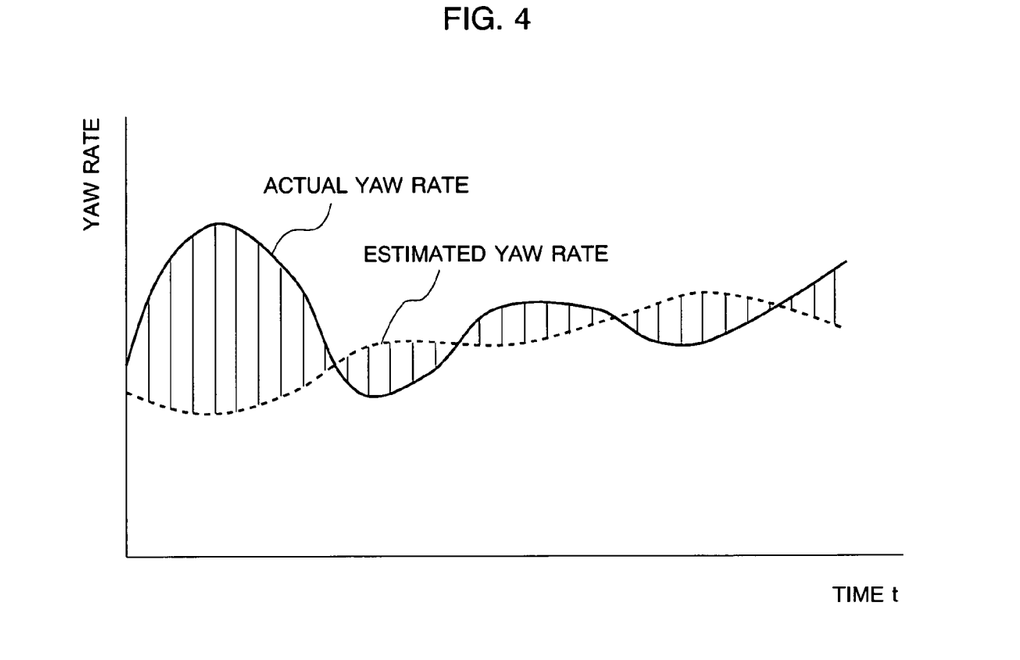
FIG. 4 is a diagram showing the concept of an estimating function.

FIG. 4 is a schematic diagram showing the estimation function. In FIG. 4, time-sequential variation of an actual vehicle parameter (for example, an actual yaw rate) is indicated by a solid line, and time-sequential variation of an estimated vehicle parameter (for example, an estimated yaw rate) is indicated by a broken line. As shown in the equation 3, the estimation function corresponds to the integration of difference (an absolute value) between the actual vehicle parameter Vt and the estimated vehicle parameter Vc (the area of a hatched area shown in FIG. 4). In other words, the estimation function is set so that the adaptive value A is lowered, as the estimated yaw rate is closer to the actual yaw rate.

The optimizing unit 10 calculates the adaptive value A for each individual 1 to N, and rearranges the individuals 1 to N in the increasing order of the adaptive value A. As a result, the individuals 1 to N of the individual assembly are rearranged as individuals 1 to N, in order of increasing difference between the actual vehicle parameter and the estimated vehicle parameter.

In step S3, it is judged whether the value of the adaptive value A concerning the individual 1 is greater than the value of a judgment adaptive value Aerror. The judgment adaptive value Aerror is set as the maximum value of the adaptive value A at which the estimated yaw rate and the actual yaw rate can be regarded as being substantially identical to each other. Accordingly, if a positive judgment is made in the step S3 (the adaptive value A is greater than the judgment adaptive value Aerror), the process shifts to the subsequent step S4. Else, if a negative judgment is made in the step S3 (the adaptive value A is equal to or smaller than the judgment adaptive value Aerror), the process shifts to step S6 at the subsequent stage.

In the step S4, the individuals 1 to N are selected or eliminated by use of a known manner. Such a selecting/eliminating manner is, for instance, inverse roulette type selection, ranking type selection, tournament type selection, or the like. Through the process of the step S4, an individual or an individual group is selected, and deleted from the individual assembly. The same numbers of individuals are shifted to the position at which individuals are deleted as described above, for example, in the increasing order of the adaptive value A, whereby the number of the individuals constituting the population is maintained.

In step S5, a next generation population is generated. Specifically, the optimizing unit 10 carries mutation and chiasma to the genetic type Kij, θj constituting an individual in the assembly. The mutation means that any genetic type Kij (or θj) of some individual is selected by a random number or the like, then, converted to a value generated by another random number. Furthermore, the chiasma means that the values of genetic types Kij (or θj) selected by random numbers are mutually exchanged to each other, in some individual group selected by a random number. However, the method of selecting an individual(s) subjected to the mutation and the chiasma is not limited to the above-described random number selecting method. Besides, with respect to an individual having the lowest adaptive value A, it may not be subjected to mutation and chiasma to keep the individual concerned. The process returns to the step S2 and the subsequent steps to repeat the above-described processes until the adaptive value A of the individual 1 becomes equal to or lower than the adaptive value Aerror.

On the other hand, in the step S6 associated with the positive judgment of the step S3, the genetic types Kij, θj constituting the individual 1 are determined as the optimum solution, and the process exits the entire routine. In this case, the optimizing unit 10 determines the values of the genetic types Kij, θj as the optimum solution of the corresponding coupling weight coefficients Kij and threshold values θj based on the genetic types Kij, θj constituting the individual 1. The optimum solution thus determined is output to the RNN, and set to the coupled coefficient Kij and the threshold value θj of the RNN in each of the estimating modules 21 to 24. Consequently, the vehicle motion model unit 20 containing the estimation modules 21 to 24 alone or the generating device 1 itself functions as a vehicle motion model.

Figure 5:
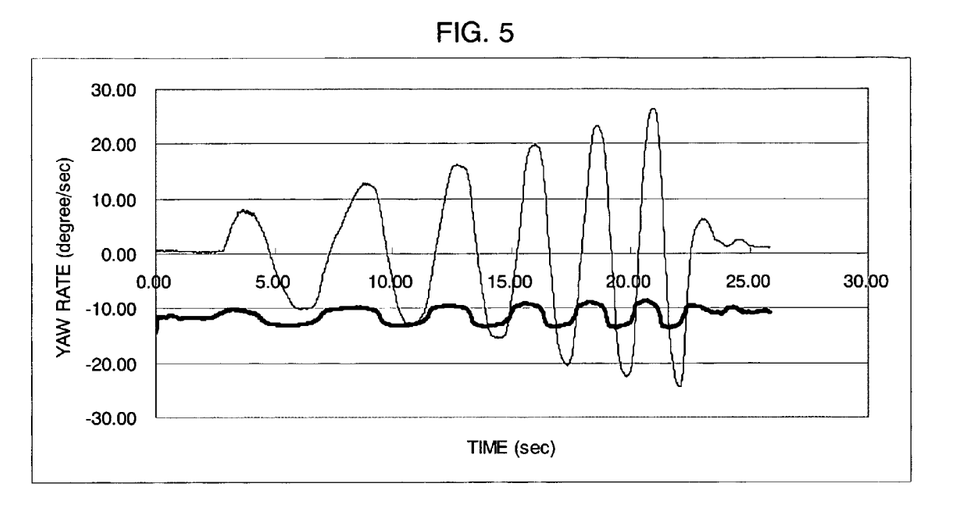
FIG. 5 is a diagram showing a learning result concerning a first-generation individual of the RNN.
Figure 6:
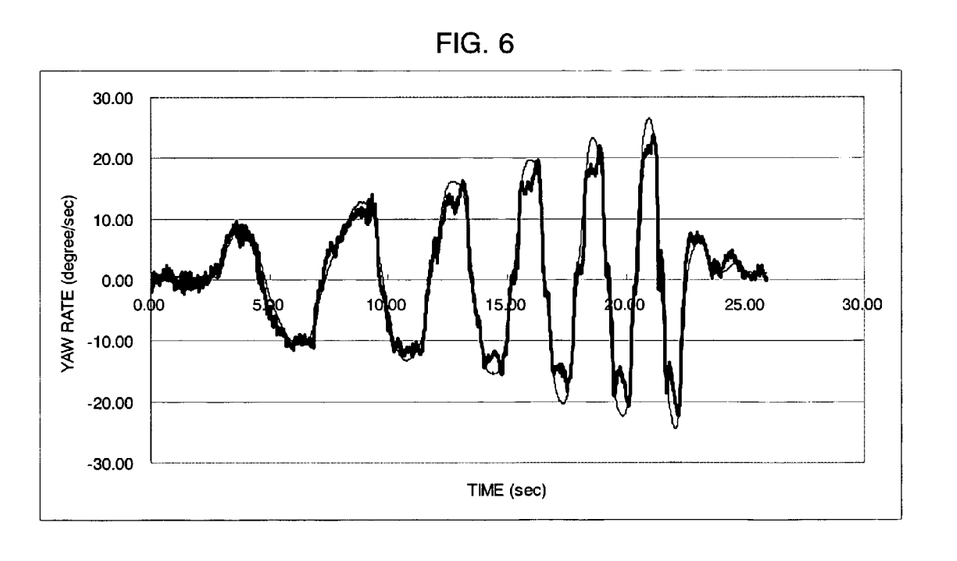
FIG. 6 is a diagram showing a learning result concerning a 100-th generation individual of the RNN.
Figure 7:
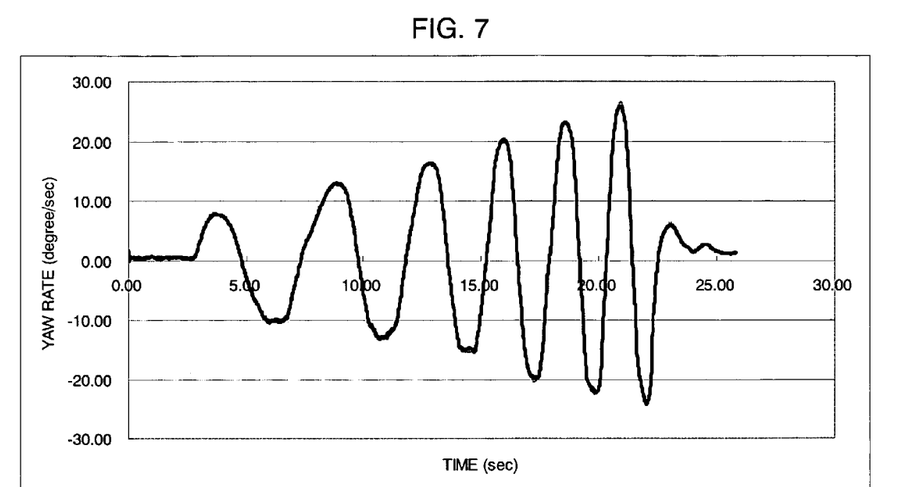
FIG. 7 is a diagram showing a learning result concerning a 30,000-th generation individual of the RNN.
Figure 8:
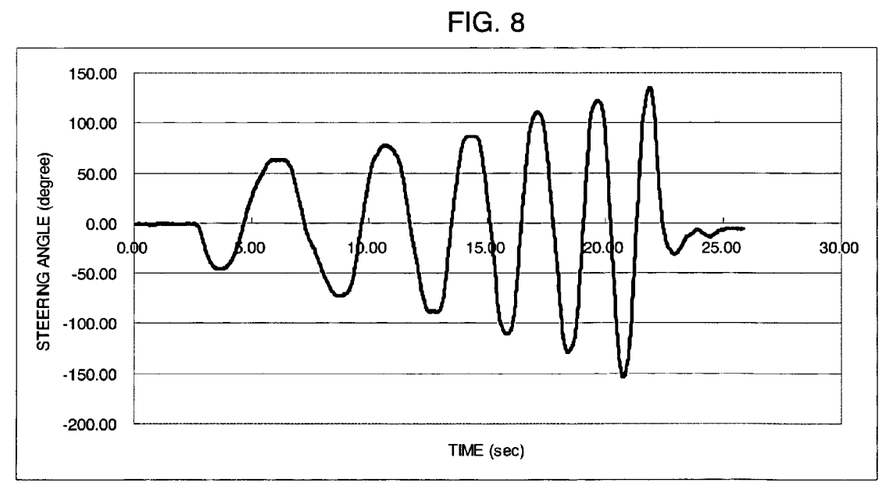
FIG. 8 is a diagram showing an example of a condition given to the RNN.

FIGS. 5 to 7 show learning results of the RNN. FIG. 5 shows a learning result concerning a first-generation individual. FIG. 6 shows a learning result concerning 100-th individual. FIG. 7 shows a learning result concerning 30,000-th individual. In these figures, an actual vehicle parameter (a yaw rate) under the above-described predetermined condition (for example, the steering angle shown in FIG. 8) is drawn as a thin solid line. Meanwhile, the estimated vehicle parameter (the yaw rate) under the same condition is drawn as a heavier solid line. As apparent from these figures, in the first generation, both the lines show the same tendency in an amplitude period, however, are greatly different in value. Thus, the estimated vehicle parameter does not reproduce the actual vehicle parameter. In the 100-th generation, although both the lines show the same tendency, a difference between the lines appears in the neighborhood of the local maximum (or minimum) point. In the 30,000-th generation, both the lines show substantially the same value over the entire area, where the thin line corresponding to the actual vehicle parameter is covered by the heavy solid line corresponding to the estimated vehicle parameter. As described above, by learning until the 30,000-th generation or the like, the estimated parameter can reproduce the actual vehicle parameter with high level or precision. That is, by learning with the genetic algorithm, the optimum solution of the weight coefficient Kij of the RNN containing the feedback loop can be effectively derived.

As described above, the learning of the coupling weight coefficient Kij (further, the threshold value θj) of the RNN is carried out by using the genetic algorithm to determine the optimum solution, according to the present embodiment. The RNN containing feedback has a problem not able to use a learning rule based on the principle of a steepest lowering method such as back propagation. However, this problem can be solved by using the genetic algorithm, according to the present embodiment.

By using the RNN, the output of the output layer node Nn containing the vehicle parameter is fed back to the input layer node Nn. Therefore, the value fed back to the RNN is reflected, so that the RNN of the present embodiment can estimate the vehicle parameter while the previous output thereof is added to the estimation. As a result, the method according to the present embodiment can generate a vehicle motion model which represents the motion state of an actual vehicle more accurately than the feed-forward type neural network, that is, has excellent reproducibility of the motion state of a vehicle.

In the present embodiment, each of the estimating modules 21 to 24 outputs one vehicle parameter. For example, a node Nn for outputting the above four vehicle parameters may be equipped to the output layer in one RNN, whereby the one RNN can be substituted for four RNNs. However, according to the system construction of the present embodiment, the number of the nodes Nn constituting each RNN can be reduced by designing a node Nn for outputting a vehicle parameter as a single body. Accordingly, the learning speed of the optimizing unit 10 is increased for each of the estimating modules 21 to 24. Furthermore, as the learning speed is increased, the number of individuals in an initial individual assembly could be increased. Thus, learning can be performed while various individuals are contained in the individual assembly when the learning is carried out by using a genetic algorithm. Accordingly, the optimum solution of the genetic type Kij, θj can be determined with high precision. Additionally, if the number of nodes is small, there could be achieved such an effect that the combination of the nodes can be established in a small-scale, so that the number of dimension in solution space in the genetic algorithm can be reduced. In conclusion, the optimum solution is more liable to be detected.

The vehicle parameters output from the estimating modules 21 to 24 represent the motion state concerning the common vehicle. Therefore, even if the types thereof are different, the vehicle parameters must vary synchronously to each other due to the motion of the vehicle. Therefore, according to the present embodiment, the state variable P is output from the estimating module 21 for the yaw rate, and then, input to the estimating modules 22 to 24, for instance. The state variable P output from the estimating module 21 for the yaw rate has high correlation with the vehicle parameter (specifically, the yaw rate), that is, the output result of the estimating module 21 by learning the coupling weight coefficient Kij with use of the genetic algorithm. For example, the state variable P represents the motion state of the vehicle or the road surface state corresponding to the yaw rate of the vehicle. Therefore, in the estimating modules 22 to 24 to which the state variable P is input, the coupling weight coefficient Kij is learned under the condition that the state variable P having the correlation with the yaw rate is included, so that the RNNs constituting the four estimating modules 21 to 24 can be synchronized one another. Basically, the state variable P functions as a reference value for synchronization with the estimating module 21 in the estimating modules 22 to 24. Accordingly, in the system construction of the present embodiment, each vehicle parameter can reproduce a value closer to the motion state of the actual vehicle as compared with a case where the estimating modules 21 to 24 are constructed independently of one another.

The state variable P functioning as described above is not limited to the output from the estimating module 21 for the yaw rate, and may be any one of the outputs of the estimating modules 22 to 24. However, among the vehicle parameters, the yaw rate can be detected with relatively higher precision than the other vehicle parameters. Thus, the state variable P is preferably output from the estimating module 21 for the yaw rate (in short, the reliability of the state variable P is enhanced). Furthermore, the present embodiment may be modified so that each state variable P is output from the estimating modules 21 to 24, then, input to an estimating module different from an estimating module at the output side, thereby making the estimating modules have association (synchronism) with each other. In the above-described embodiment, the state variable P is handled as a variable which has correlation with the yaw rate and represents the road surface state or the motion state of the vehicle. However, from the viewpoint that the state variable P has correlation with the yaw rate, the vehicle parameter (the yaw rate) output from the node N16 itself may be set as the state variable P.

In the present embodiment, the vehicle motion model unit 20 is constructed by the four estimating modules 21 to 24. However, the invention is not limited to this mode. The number of estimating modules may be arbitrarily determined in accordance with the necessary vehicle parameters. In addition, the vehicle parameters are not limited to the four values, which are, the yaw rate, the lateral G, the roll and the pitch, and may include other parameters such as a vehicle slipping angle, a front-wheel slipping angle, a rear-wheel slipping angle, the friction coefficient between the wheels and the road surface, etc.

Furthermore, in the present embodiment, the coupling weight coefficient Kij and the threshold value θj of the RNN are learned by referring to a map and comparing this map with the output of the RNN. However, the generating device 1 may be mounted in an actual vehicle to carry out the learning on a real-time basis. In this case, the steering angle, the steering angular velocity, the steering angular acceleration, the steering reaction force, the vehicle speed, and the vehicle acceleration which correspond to the inputs are detected from sensors or calculated based on detected values, and then, set as inputs of the RNN. The vehicle parameters corresponding to the outputs are detected by sensors, and the detected values and the outputs of the RNN are compared.

Second Embodiment

Figure 9:
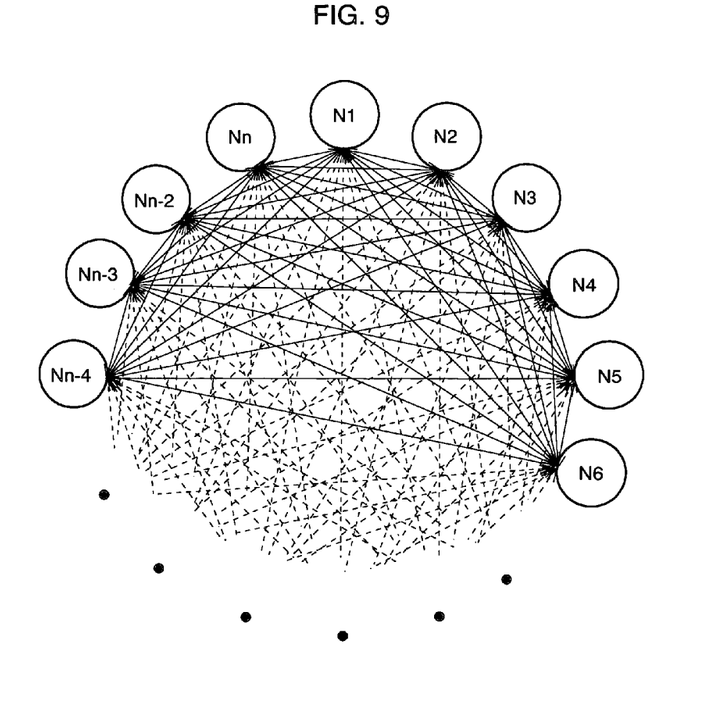
FIG. 9 is a diagram showing the network structure of the RNN constituting each estimating module according to a second embodiment.

FIG. 9 is a diagram showing the network structure of the RNN constituting each of the estimating modules 21 to 24 according to a second embodiment. In the embodiment shown in FIG. 9, some nodes Nn are omitted from the illustration for the same of convenience. Each of the estimating modules 21 to 24 corresponds to the RNN comprising the plural nodes Nn and the optimum solution of the coupling weight coefficient Kij and the threshold value θj is determined by using the genetic algorithm, similarly to the first embodiment. However, according to the second embodiment, the network structure of the RNN serving as a premise is different from that of the first embodiment. The RNN according to the first embodiment has a hierarchical structure, where the connection among the nodes Nn is determined in advance by setting the number of the nodes Nn constituting each layer. On the other hand, in the RNN according to the second embodiment, plural nodes are mutually connected to each other so that some node Nn is coupled to all nodes including the node Nn itself. Accordingly, the output of the node N1 is input to all the nodes N1 to Nn including the node N1 itself. Meanwhile, the outputs of all the nodes N1 to Nn are input to the node N1.

Figure 10:
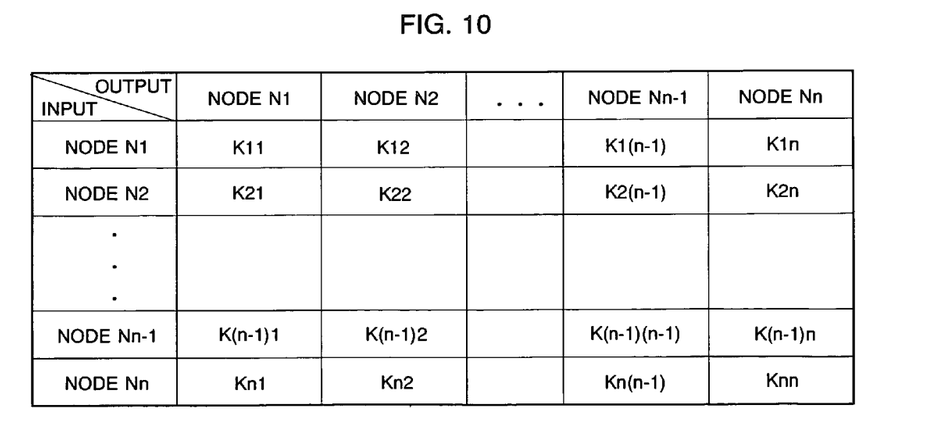
FIG. 10 is a diagram showing the corresponding relationship in coupling weight coefficient among nodes.

FIG. 10 is a diagram showing the correspondence of coupling weight coefficient Kij to each other among the nodes. In the network as described above, the coupling weight coefficients Kij among the nodes are represented as a matrix shown in FIG. 10. This matrix represents the coupling weight coefficients Kij concerning the connection among all the nodes irrespective of the type such as feedforward and feedback. In the present embodiment, the optimizing unit 10 in the above-described network structure determines the optimum solution of the coupling weight coefficient Kij and the threshold value θj, with the mutual connection of plural nodes as a processing target.

The method of determining the optimum solution of the coupling weight coefficient Kij and the threshold value θj is basically the same as in the first embodiment. Therefore, only a brief description thereof will be made hereunder, and the detailed description is omitted. Specifically, first, the coupled coefficient Kij (that is, K11 to Knn) and the threshold value θj shown in FIG. 10 are set to a genetic type, and plural individuals comprising genetic types having various values are prepared (an initial individual assembly is generated). The adaptive value A is calculated for every individual. In this case, random six nodes Nn are selected from the nodes Nn constituting the network. In addition, the steering angle, the steering angular velocity, the steering angular acceleration, the steering reaction force, the vehicle speed and the vehicle acceleration are input to the selected nodes based on the above-described map. The next, any one of the nodes Nn different from the nodes used for input is selected, and the output is acquired from the node Nn thus selected. Based on this output and the vehicle parameters described on the map, the adaptive value A is calculated by using the estimation function shown by the equation 3. Similarly to the processes shown in FIG. 3, the selection, elimination and generation of the next generation population are repeated until the adaptive value A becomes equal to or smaller than the judgment adaptive value Aerror. Consequently, the optimum genetic type Kij, θj is determined, whereby the optimum solution of the coupling weight coefficient Kij and threshold value θj in the RNN is determined.

As described above, the present embodiment adopts the RNN having the network structure whose coupling state is not initially limited or fixed, and in which feedforward and feedback are contained and all the nodes are connected to each other. Even in such a network structure, the coupling weight coefficient Kij (and threshold value θj) can be determined by using the genetic algorithm. In this case, if the value of the determined coupling weight coefficient Kij becomes "0", coupling of the node Ni and the node Nj becomes redundant. In other words, although all the nodes Nn are formally coupled one another as a network, only necessary nodes remain substantially in accordance with the value of the coupling weight coefficient Kij. More specifically, by learning the coupling weight coefficient Kij according to the genetic algorithm, nodes necessary to calculate the vehicle parameter are equivalently selected. Of course, it is expected as a learning result that the network structure as shown in FIG. 2 be generated in accordance with the value of the coupling weight coefficient Kij. However, in such a case, only the necessary nodes are selected from the RNN in which all the nodes Nn are connected to each other. Thus, it is advantageously guaranteed by the genetic algorithm that the network structure concerned is the optimum structure to estimate the vehicle parameter.

Figure 11:
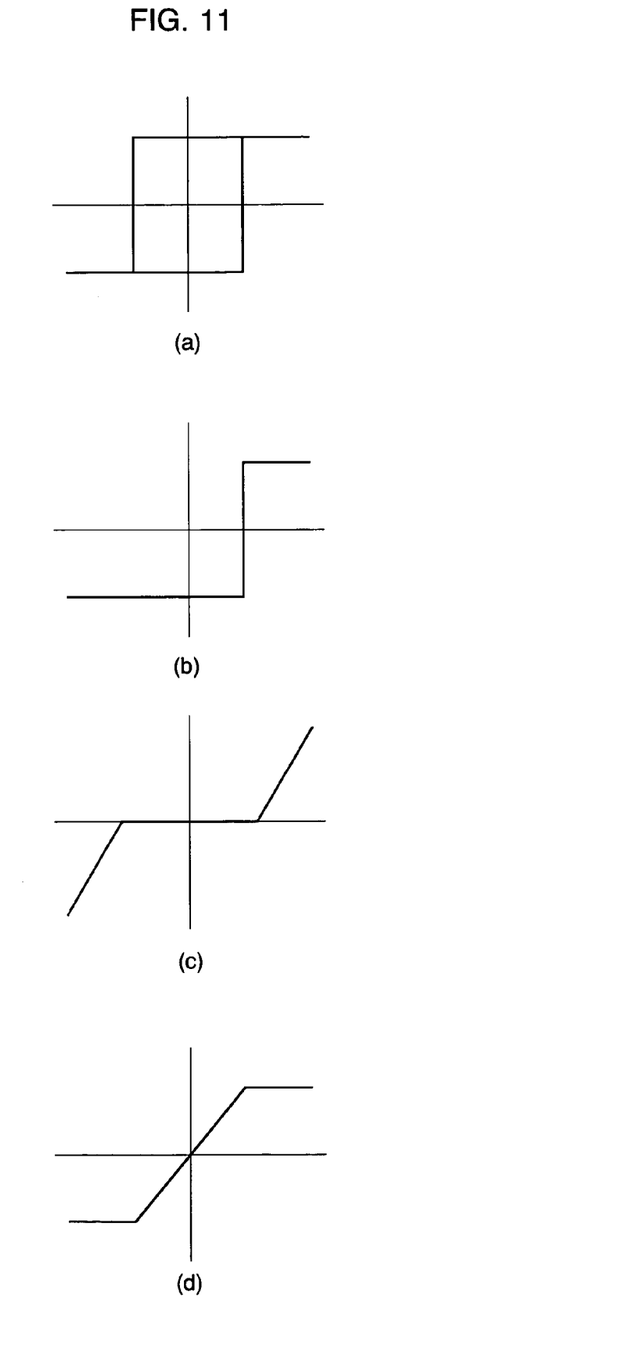
FIG. 11 is a diagram showing an example of a transfer function.

In the first and second embodiments, the foregoing description has been made on the assumption that the transfer function is the sigmoid function. However, if the learning is carried out by using the genetic algorithm, the transfer function of the nodes constituting the RNN is not limited to the sigmoid function. For example, a non-sigmoid function as shown in FIG. 11 may be used as the transfer function. FIG. 11(a) shows an example of a function in which the output indicates a non-linear characteristic called as hysteresis with respect to the input. FIGS. 11(b) to (d) show examples of functions indicating non-linear characteristics called binarization, dead zone and limiter.

The transfer function is not limited to the functions indicating these non-linear characteristics, and may be a function containing an element like a sequence circuit. That is, a function in which the output is determined by a past input sequence may be used as the transfer function. As such a function may be used time delay ($Z^{-1}$), peak hold (the peak value during a predetermined interval is output), maximum value (the time-sequential peak value is output), integration, differentiation, etc.

By including non-sigmoid functions in the transfer function of the nodes Nn as described above, a vehicle motion model that can represent even input/output characteristics which cannot be represented by the sigmoid function can be generated. Accordingly, the vehicle motion model as described above can represent an input/output response when a rear wheel of a vehicle slips, thus, the motion model of the vehicle changes drastically at a dash. Therefore, the reproducibility of the motion state of the vehicle can be enhanced.

The vehicle motion model generating device for generating the vehicle motion model as described above or the vehicle motion model generated by the vehicle motion model generating device is usable while installed in a part of a road surface friction coefficient estimating device for estimating the road surface friction coefficient or a vehicle behavior estimating device for estimating the behavior of a vehicle. For example, when this vehicle motion model is applied to the road surface friction coefficient estimating device, there are prepared a high-μ vehicle motion model in which the motion state of the vehicle on the road surface having a high road surface friction coefficient has been learned. Additionally, a low-μ vehicle motion model in which the motion state of the vehicle on the road surface having a low road surface friction coefficient has been learned. Thereafter, the steering angle, the steering angular velocity, the steering angular acceleration, the steering reaction force, the vehicle speed, and the vehicle acceleration concerning the present vehicle are input to each vehicle motion model to derive a vehicle parameter such as the yaw rate. Furthermore, the motion state of the vehicle corresponding to the vehicle parameter thus derived is detected by a sensor or the like. This detected value is compared with the value derived from the vehicle motion model. Accordingly, the road surface state corresponding to the learning condition of one vehicle motion model exhibiting such a tendency that the above values are approximated to each other can be estimated as the present road surface friction coefficient. On the other hand, the vehicle behavior estimating device inputs the steering angle, the steering angular velocity, the steering angular acceleration, the steering reaction force, the vehicle speed and the vehicle acceleration concerning the present vehicle to the vehicle motion model to derive the vehicle parameter such as the yaw rate, and estimates a behavior the vehicle indicates. Furthermore, by using this vehicle motion model, the behavior of the vehicle and ride quality of the vehicle can be also estimated.

As described above, according to this invention, the optimum solution of the coupling weight coefficient of the recurrent neural network having the feedback loop can be determined by using the genetic algorithm. Furthermore, the feedback element can be taken into consideration in the recurrent neural network by applying the recurrent neural network to the vehicle motion model. Accordingly, there can be generated a vehicle motion model more suitable for the motion state of the actual vehicle than the feed-forward type recurrent neural network, or enhanced in reproducibility of the motion state of the vehicle.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

Additionally, the disclosure of Japanese Patent Application No. 2003-041507 filed on Feb. 19, 2003 including the specification, drawing and abstract is incorporated herein by reference in its entirety.

What is claimed is:

1. A vehicle motion model generating device for generating a vehicle motion model that represents a motion state of a vehicle, comprising:

a first recurrent neural network formed by connecting plural nodes such that an output of a node is input to another node in accordance with a predetermined coupling weight coefficient, comprising a feedback loop of an output of at least one node, and outputting a vehicle parameter indicating said motion state of the vehicle based on predetermined input information, thereby functioning as said vehicle motion model;

plural second recurrent neural networks, each of said second recurrent neural networks formed by connecting second plural nodes such that a second output of a second node is input to another second node in accordance with a second predetermined coupling weight coefficient, comprising a second feedback loop of a second output of at least one second node, and outputting a second vehicle parameter different from said vehicle parameter output from said first recurrent neural network and indicating said motion state of the vehicle based on said predetermined input information, thereby functioning as said vehicle motion model; and an optimizing unit for determining an optimum solution of said predetermined coupling weight coefficient of said first recurrent neural network and said second predetermined coupling weight coefficient of said plural second recurrent neural networks based on a learning rule using a hereditary algorithm, wherein said first recurrent neural network and said plural second recurrent neural networks are mutually connected to each other such that a state variable including a correlation with said vehicle parameter output from said first recurrent neural network is input to each of said plural second recurrent neural networks.

2. The vehicle motion model generating device according to claim 1, wherein said state value represents one of a road surface state and a motion state of the vehicle.

3. The vehicle motion model generating device according to claim 1, wherein said predetermined input information comprises at least one of a steering angle, a steering angular velocity, a steering angular acceleration, a steering reaction force, a vehicle speed, and a vehicle acceleration, and wherein said vehicle parameter comprises at least three of an estimation value of a yaw rate, an estimation value of lateral acceleration, an estimation value of roll, and an estimation value pitch.

4. The vehicle motion model generating device according to claim 1, wherein said first recurrent neural network outputs an estimation value of a yaw rate as said vehicle parameter.

5. A road surface friction coefficient estimating device for estimating a road surface friction coefficient based on a vehicle motion model that represents a motion state of a vehicle and is generated by a vehicle motion model generating device, wherein said vehicle motion model generating device comprises:

a first recurrent neural network formed by connecting plural nodes such that an output of a node is input to another node in accordance with a predetermined coupling weight coefficient, comprising a feedback loop of an output of at least one node, and outputting a vehicle parameter indicating said motion state of the vehicle of based on a predetermined input information, thereby functioning as said vehicle motion model;

plural second recurrent neural networks, each of said second recurrent neural networks formed by connecting second plural nodes such that a second output of a second node is input to another second node in accordance with a second predetermined coupling weight coefficient, comprising a second feedback loop of a second output of at least one second node, and outputting a second vehicle parameter different from said vehicle parameter output from said first recurrent neural network and indicating said motion state of the vehicle based on said predetermined input information, thereby functioning as said vehicle motion model; and an optimizing unit for determining an optimum solution of said predetermined coupling weight coefficient of said first recurrent neural network and said second predetermined coupling weight coefficient of said plural second recurrent neural networks based on a learning rule using a hereditary algorithm, wherein said first recurrent neural network and said plural second recurrent neural networks are mutually connected to each other such that a state variable including a correlation with said vehicle parameter output from said first recurrent neural network is input to each of said plural second recurrent neural networks.

6. A vehicle behavior estimating device for estimating a behavior of a vehicle based on a vehicle motion model that represents a motion state of a vehicle and is generated by a vehicle motion model generating device, wherein said vehicle motion model generating device comprises:

a first recurrent neural network formed by connecting plural nodes such that an output of a node is input to another node in accordance with a predetermined coupling weight coefficient, comprising a feedback loop of an output of at least one node, and outputting a vehicle parameter indicating of said motion state of the vehicle based on the predetermined input information, thereby functioning as said the vehicle motion model;

plural second recurrent neural networks, each of said second recurrent neural networks are formed by connecting second plural nodes to another second node in accordance with a second predetermined coupling weight coefficient, comprising a second feedback loop of a second output of at least one second node, and outputting a second vehicle parameter different from said vehicle parameter output from said first recurrent neural network and indicating said motion state of the vehicle based on said predetermined input information, thereby functioning as said vehicle motion model; and an optimizing unit for determining an optimum solution of said predetermined coupling weight coefficient of said first recurrent neural network and said second predetermined coupling weight coefficient of said plural second recurrent neural networks based on a learning rule using a hereditary algorithm, wherein said first recurrent neural network and said plural second recurrent neural networks are mutually connected to each other such that a state variable including a correlation with said vehicle parameter output from said first recurrent neural network is input to each of said plural second recurrent neural networks.

7. A method for generating a vehicle motion model that represents a motion state of a vehicle, wherein a first recurrent neural network formed by connecting plural nodes such that an output of a node is input to another node in accordance with a predetermined coupling weight coefficient and includes a feedback loop of an output of at least one node, and plural second recurrent neural networks each formed by connecting the second plural nodes such that a second output of a second node is input to another second node in accordance with a second predetermined coupling wake coefficient and includes a second feedback loop of a second output of at least one second node, said method being executed by a computer, and said method comprising:

determining an optimum solution of a genetic type based on a learning rule using a hereditary algorithm while setting said predetermined coupling weight coefficient of said first recurrent neural network and said second predetermined coupling weight coefficient of said plurality of second recurrent neural networks as said genetic type;

outputting an optimum solution of said predetermined coupling weight coefficient to said first recurrent neural network based on said optimum solution of said genetic type;

outputting a second optimum solution of said second predetermined coupling weight coefficient to said plurality of second recurrent neural networks based on said optimum solution of said genetic type;

outputting a first vehicle parameter from said first recurrent neural network indicating said motion state of the vehicle based on predetermined input information, and outputting at least one second vehicle parameter from said plurality of second recurrent neural networks indicating said motion state of the vehicle based on said predetermined input information, thereby functioning as said vehicle motion model; and outputting a state variable from said first recurrent neural network to each of said plural second recurrent neural networks, said state variable including a correlation with said first vehicle parameter.

8. The method according to claim 7, wherein said state value represents one of a road surface state and a motion state of the vehicle.

9. The method according to claim 7, wherein said predetermined input information comprises at least one of a steering angle, a steering angular velocity, a steering angular acceleration, a steering reaction force, a vehicle speed, and a vehicle acceleration, and wherein said second vehicle parameters comprise at least three of an estimation value of a yaw rate, an estimation value of lateral acceleration, an estimation value of roll, and an estimation value pitch.

10. The method according to claim 7, comprising:

outputting an estimation value of a yaw rate as said first vehicle parameter by said first recurrent neural network.

11. The vehicle motion model generating device according to claim 1, wherein said plural second recurrent neural networks comprise at least two recurrent neural networks that each receive said state variable from said first recurrent neural network.

12. The road surface friction coefficient estimating device according to claim 5, wherein said plural second recurrent neural networks comprise at least two recurrent neural networks that each receive said state variable from said first recurrent neural network.

13. The vehicle behavior estimating device according to claim 6, wherein said plural second recurrent neural networks comprise at least two recurrent neural networks that each receive said state variable from said first recurrent neural network.

14. The method according to claim 7, wherein said plural second recurrent neural networks comprise at least two recurrent neural networks that each receive said state variable from said first recurrent neural network.

15. The vehicle motion model generating device according to claim 1, wherein said predetermined coupling weight coefficient is output from said optimizing unit to said first recurrent neural network and each of said plurality of second recurrent neural networks.

16. The road surface friction coefficient estimating device according to claim 5, wherein said predetermined coupling weight coefficient is output from said optimizing unit to said first recurrent neural network and each of said plurality of second recurrent neural networks.

17. The vehicle behavior estimating device according to claim 6, wherein said predetermined coupling weight coefficient is output from said optimizing unit to said first recurrent neural network and each of said plurality of second recurrent neural networks.

18. The vehicle motion model generating device according to claim 1, wherein a threshold value is output from said optimizing unit to said first recurrent neural network and each of said plurality of second recurrent neural networks.

19. The vehicle motion model generating device according to claim 5, wherein a threshold value is output from said optimizing unit to said first recurrent neural network and each of said plurality of second recurrent neural networks.

20. The method according to claim 7, further comprising:
outputting a threshold value is from said optimizing unit to said first recurrent neural network and each of said plurality of second recurrent neural networks.

* * * * *